(12) United States Patent
Prokhorov

(10) Patent No.: US 10,703,361 B2
(45) Date of Patent: Jul. 7, 2020

(54) VEHICLE COLLISION MITIGATION

(71) Applicant: Toyota Motor Engineering & Manufacturing North America, Inc., Erlanger, KY (US)

(72) Inventor: Danil V. Prokhorov, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 52 days.

(21) Appl. No.: 15/622,677

(22) Filed: Jun. 14, 2017

(65) Prior Publication Data

US 2018/0362028 A1 Dec. 20, 2018

(51) Int. Cl.
*B60W 30/09* (2012.01)
*G08G 1/16* (2006.01)
*B62D 15/02* (2006.01)

(52) U.S. Cl.
CPC ......... *B60W 30/09* (2013.01); *B62D 15/0255* (2013.01); *B62D 15/0265* (2013.01); *G08G 1/166* (2013.01); *G08G 1/167* (2013.01); *B60W 2554/00* (2020.02); *B60W 2554/80* (2020.02); *B60W 2720/10* (2013.01); *B60W 2720/24* (2013.01)

(58) Field of Classification Search
CPC ...... B60W 30/09; G05D 1/0214; G08G 1/166
See application file for complete search history.

(56) References Cited

U.S. PATENT DOCUMENTS

| 7,647,178 | B2 | 1/2010 | Ekmark et al. | |
|---|---|---|---|---|
| 9,440,649 | B2 | 9/2016 | Ciotlos et al. | |
| 10,106,156 | B1* | 10/2018 | Nave | B60K 28/14 |
| 2004/0246114 | A1 | 12/2004 | Hahn | |
| 2007/0112514 | A1* | 5/2007 | Ekmark | G08G 1/161 |
| | | | | 701/301 |
| 2009/0192710 | A1* | 7/2009 | Eidehall | B62D 15/0265 |
| | | | | 701/301 |
| 2009/0243825 | A1* | 10/2009 | Schofield | B60Q 1/346 |
| | | | | 340/435 |
| 2010/0082251 | A1* | 4/2010 | Kogure | B60T 8/17558 |
| | | | | 701/301 |
| 2010/0228419 | A1* | 9/2010 | Lee | B60W 30/0953 |
| | | | | 701/25 |

(Continued)

FOREIGN PATENT DOCUMENTS

DE 102012005867 A1 9/2013
WO 2009092374 A1 7/2009

*Primary Examiner* — Donald J Wallace
(74) *Attorney, Agent, or Firm* — Christopher G. Darrow; Darrow Mustafa PC

(57) ABSTRACT

A device and method for mitigating a vehicle collision are disclosed. The device and method include monitoring for an object within a vehicle travel path that includes a heightened travel hazard level. Upon detecting the object within the vehicle travel path, a closing distance rate, relative to the object, is compared with a closing threshold. When the closing distance rate compares unfavorably with the closing threshold, a secondary vehicle travel path based on the closing distance rate is determined, producing a determined secondary vehicle travel path. A command data output is generated for transmission to autonomously engage the determined secondary vehicle travel path.

12 Claims, 6 Drawing Sheets

(56) References Cited

U.S. PATENT DOCUMENTS

| | | | |
|---|---|---|---|
| 2011/0301845 A1* | 12/2011 | Harada | B60R 21/0134 |
| | | | 701/301 |
| 2012/0293314 A1* | 11/2012 | Chatterjee | B60Q 9/008 |
| | | | 340/436 |
| 2013/0024075 A1* | 1/2013 | Zagorski | B60W 30/095 |
| | | | 701/46 |
| 2014/0229069 A1* | 8/2014 | Akiyama | B60T 7/12 |
| | | | 701/41 |
| 2014/0316668 A1* | 10/2014 | Akiyama | B60W 10/184 |
| | | | 701/70 |
| 2015/0161895 A1* | 6/2015 | You | G08G 1/167 |
| | | | 701/70 |
| 2015/0175159 A1* | 6/2015 | Gussner | B62D 15/0265 |
| | | | 701/1 |
| 2017/0080952 A1* | 3/2017 | Gupta | B60K 35/00 |
| 2017/0278401 A1* | 9/2017 | Probert | G08G 1/167 |
| 2018/0081371 A1* | 3/2018 | Bar-Tal | G05D 1/0253 |

* cited by examiner

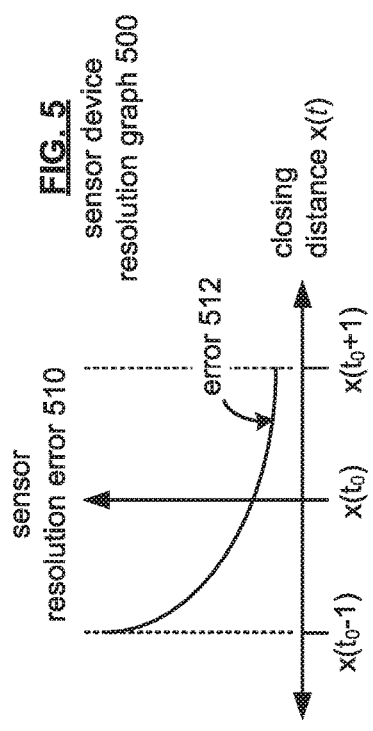
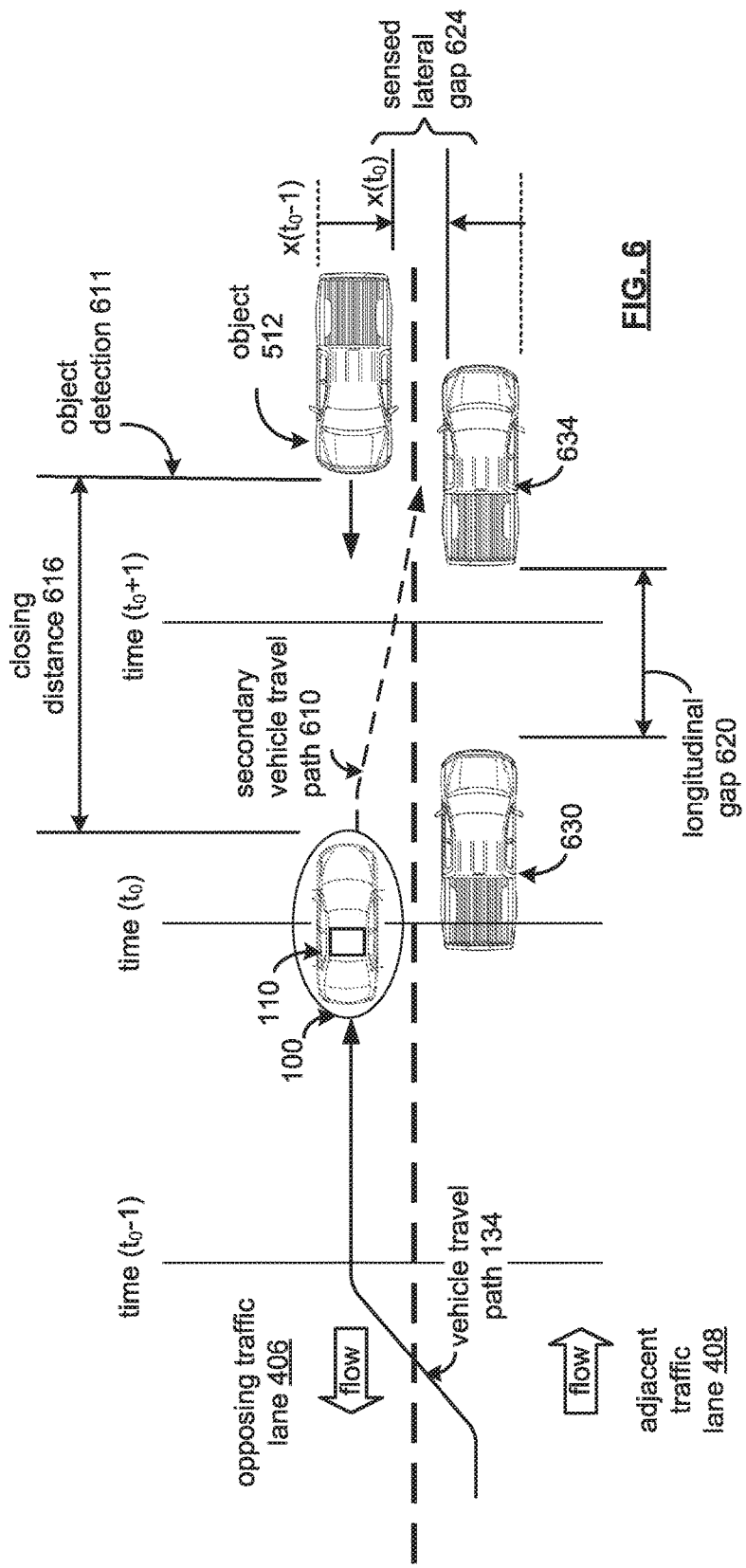

VEHICLE COLLISION MITIGATION

FIELD

The subject matter described herein relates in general to vehicles with autonomous capability and, more particularly, to autonomously overriding manual vehicle operation to mitigate a vehicle collision.

BACKGROUND

Generally, some autonomously-capable vehicles include a manual operational mode option for operators to manually-control the vehicle. In some instances, an operator may make an error-in-judgment where the driving maneuver, such as misjudging the distance to opposing traffic when passing a vehicle. As a result, such errors-in-judgment tend escalate the potential for a head-on collision with other vehicles, or objects, placing the operator in eminent danger. It is desirable for an autonomously-capable vehicle to respond to an error-in-judgment, and to provide vehicle collision mitigation operable to de-escalate the potential for a head-on collision.

SUMMARY

A device and method for vehicle collision mitigation are disclosed.

In one implementation, a method for mitigating a vehicle collision is disclosed. The method includes monitoring for an object within a vehicle travel path that includes a heightened travel hazard level. Upon detecting the object within the vehicle travel path, a closing distance rate, relative to the object, is compared with a closing threshold. When the closing distance rate compares unfavorably with the closing threshold, a secondary vehicle travel path based on the closing distance rate is determined, producing a determined secondary vehicle travel path. A command data output is generated for transmission to autonomously engage the determined secondary vehicle travel path.

In another implementation, a vehicle control unit is disclosed. The vehicle control unit includes a wireless communication interface to service communication with a vehicle network, a processor communicably coupled to the wireless communication interface and a plurality of sensor devices, and memory communicably coupled to the processor. The memory stores an object monitoring module including instructions that, when executed by the processor, cause the processor to monitor low resolution sensor device data of at least one of the plurality of sensor devices for an object within a vehicle travel path that includes a heightened travel hazard level. Upon detection of the object within the vehicle travel path, the instructions operate to cause the processor to compare a closing distance rate relative to the object with a closing threshold. When the closing distance rate compares unfavorably with the closing threshold, the object monitoring module produces a collision avoidance signal. The memory further stores a vehicle collision mitigation module including instructions that, when executed by the processor, cause the processor to produce, in response to the collision avoidance signal, a handover command operable to initiate a vehicle control handover to an autonomous operational mode for transmission via the wireless communication interface, determine a secondary vehicle travel path based on the closing distance rate to produce a determined secondary vehicle travel path, and generate a vehicle action command operable to autonomously engage the determined secondary vehicle travel path for transmission via the wireless communication interface.

BRIEF DESCRIPTION OF THE DRAWINGS

The description makes reference to the accompanying drawings wherein like reference numerals refer to like parts throughout the several views, and wherein:

FIG. 5 illustrates a sensor device resolution graph;

FIG. 6 illustrates an example vehicle collision mitigation through a sensed lateral gap in context with the sensor device resolution graph of FIG. 5.

DETAILED DESCRIPTION

A method and device for mitigating a vehicle collision are described herein. One example method describes monitoring for an object within a vehicle travel path that includes a heightened travel hazard level (such as an opposing traffic lane, a parking lane, a sidewalk, a bicycle lane, a road shoulder, a construction zone, etc.). That is, a vehicle operator may have moved from a customary traffic flow to one that has increased hazards. Such a deviation may be to pass another vehicle on a two-lane roadway, or perhaps had unknowingly moved to an area of the roadway not commonly associated with a normal and/or customary traffic flow.

Upon detecting the object within the vehicle travel path, a closing distance rate relative to the object can be compared with a threshold. When the comparison is unfavorable (for example, the threshold may indicate when a collision is highly likely), a change in control from the operator to the autonomously-capable vehicle may take place. In this respect, a secondary vehicle travel path based on the closing distance rate. The secondary vehicle travel path may include a gap that is available for receiving the vehicle, and further include autonomous adjustment of vehicle acceleration and/or vehicle heading, for autonomously engaging the secondary vehicle travel path.

As may be appreciated, the gap may be defined across a vehicle (that is, a lateral gap) as well as along a length of the vehicle (that is, a longitudinal gap). The reference to a lateral and/or longitudinal gap may be considered with respect to using an orientation reference of the vehicle.

Figure 1:
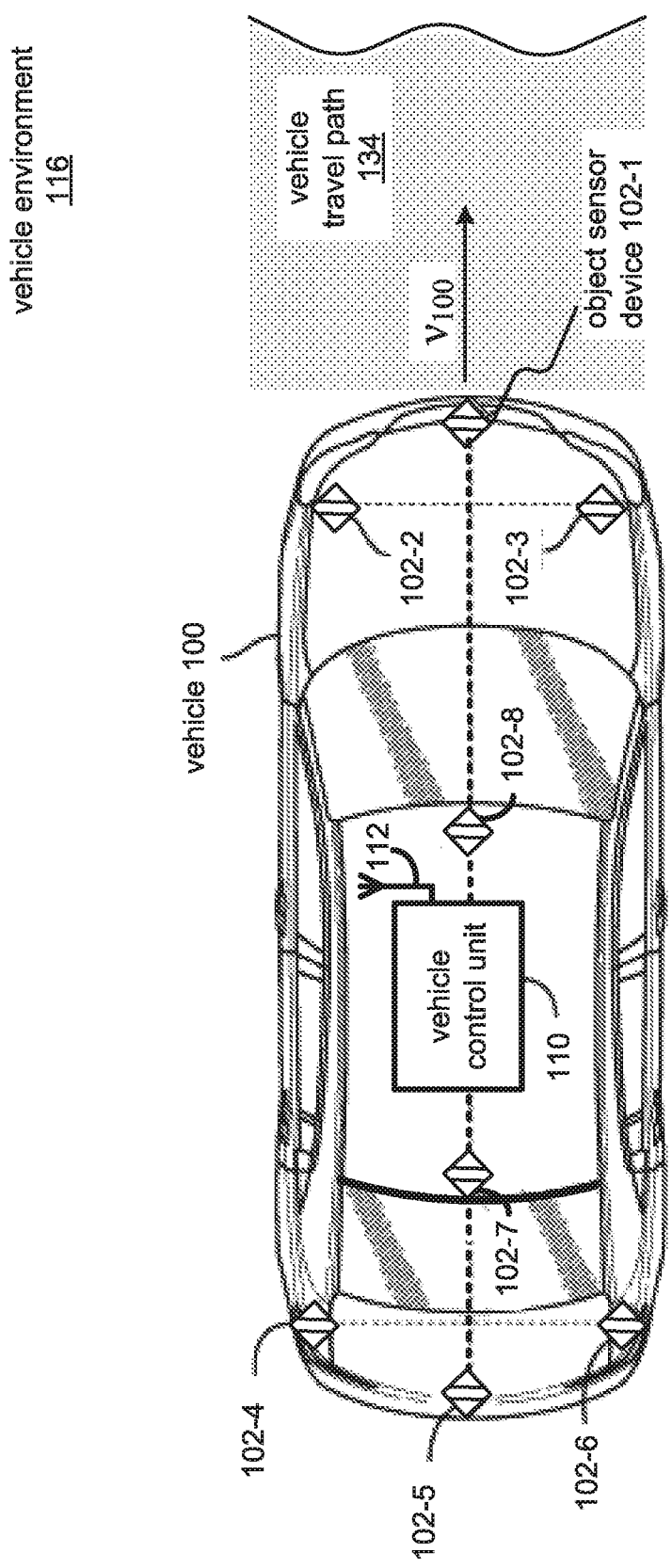
FIG. 1 shows a schematic illustration of a vehicle including a vehicle control unit communicatively coupled with an antenna for providing autonomously-capable operations in a vehicle environment.

FIG. 1 is a schematic illustration of a vehicle 100 including a vehicle control unit 110 communicatively coupled with an antenna 112 for providing autonomously-capable operations in a vehicle environment 116. As may be appreciated, the vehicle 100 may be an automobile, light truck, cargo transport, or any other passenger or non-passenger vehicle.

The antenna 112, communicatively coupled with the vehicle control unit 110, may include one or more conductive elements that interact with electromagnetic signals transmitted by global positioning system satellites. The received signals may be transformed into a data signal indicative of the location (for example, latitude and longitude positions), and further indicative of the positioning of the vehicle with respect to road data, as is discussed in detail with reference to FIG. 2.

As may be appreciated, various sensor devices may be utilized to provide vehicle positioning information to determine lane positions and location relative to a roadway. Examples of such sensor devices may include inertial measurement unit (IMU) sensor devices, and various permutations. An IMU sensor device may operate to measure specific vehicle forces and angular rates through accelerometer and/or gyroscope devices, and may be used for maneuvering autonomous vehicles, as well as providing tracking capabilities relative to a vehicle travel path 134. IMU sensor devices may include positioning (such as Global Positioning System) devices. For example, in such a device, a GPS receiver may continue to operate when GPS signals become unavailable, such as in tunnels, inside buildings, or in the presence of electronic interference.

A plurality of object sensor devices 102-1, 102-2, 102-3, 102-4, 102-5, 102-6, 102-7 and 102-8 (generally, object sensor devices 102) are in communication with the control unit 110. In this respect, the vehicle control unit 110 may operate to assess the vehicle environment 116, including the vehicle travel path 134, as may relate to heightened travel hazard levels to the vehicle 100.

The plurality of object sensor devices 102 may be positioned on the outer surface of the vehicle 100, or may be positioned in a concealed fashion for aesthetic purposes with regard to the vehicle 100. Communication between object sensor devices 102 and vehicle control units, including vehicle control unit 110, may be on a bus basis, and may also be used or operated by other systems of the vehicle 100.

For example, the object sensor devices 102 (as well as other sensor devices, such as an IMU sensor device) may be coupled by a combination of network architectures such as a Body Electronic Area Network (BEAN), a Controller Area Network (CAN) bus configuration, an Audio Visual Communication-Local Area Network (AVC-LAN) configuration, and/or other combinations of additional communication-system architectures to provide communications between devices and systems of the vehicle 100.

The object sensor devices 102 may, alone or in combination, operate to capture depth images or otherwise generating depth information for a captured image. For example, the object sensor devices 102 may configured to capture images (visual and non-visual spectrum wavelengths, audible and non-audible wavelengths, etc.).

The object sensor devices 102 are operable to determine distance vector measurements of objects in the vehicle environment 116. For example, each of the object sensor devices 102 may be configured to sense and/or analyze structured light, time of flight (e.g., of signals for Doppler sensing), light detection and ranging (LIDAR), light fields, and other information to determine depth/distance, direction and/or velocity of objects of the vehicle environment 116.

In operation, objects may be detected using multiple data outputs of each of the sensors 102-1 through 102-6 in combination or independently. In one example, object sensor devices 102-1, 102-2, 102-3 and 102-8 data may be used to detect objects ahead of the vehicle 100, and object sensor devices 102-4, 102-5, 102-6 and 102-7 data may be used to detect objects behind the vehicle 100.

Also, each of the object sensor devices 102 may implement respective functions to provide a collective object parameter detection based on respective spatial portions. For example, object sensor device 102-1 data may be used to detect an object, and object sensor device 102-2 data may be used to detect an object velocity relative to the vehicle 100. Further, object sensor device 102-3 data may be used in combination with object sensor device 102-1 data to corroborate a sensing and/or detection of the object.

Also, object sensor devices 102-7 and 102-8 may operate to provide elevated perception. For example, object sensor devices 102-7 and 102-8 can be positioned above object sensor devices 102-1 to 102-6. Also, object 102-7 and/or 102-8 may be located with extensible stanchions that may be configured to extend to a predetermined height above a vehicle roof-line, and to also be configured to rotate or have multiple views to cover a 360-degree area around the vehicle 100. As may be appreciated, an extensible stanchion 205 may be disposed within a vehicle mount affixed at a roof-line of the vehicle 200 to extend and retract (as well as collapse and fold) with an elevation at the vehicle roof-line. As may also be appreciated, object sensor devices 102-7 and/or 102-8 may include autonomous aerial-drone devices, which may provide an elevated perception system (based on wireless communications with the vehicle control unit 110) from a perspective above the roof-line of the vehicle 100.

As may be appreciated, an object's relative speed may also be determined via object sensor device 102 data, which may be extrapolated by successive position detection measurements of the object to calculate a speed and/or direction of motion based thereon (such as to form a motion vector).

Also, respective subsets of object sensor devices 102 may operate in combination with other subsets of object sensor devices, and may also operate in an alternately or asynchronously, simultaneously, or individually based manner for a desired sensing function and/or application.

In operation, the vehicle control unit 110 may operate to receive vehicle sensor data that can be output by object sensor devices 102. The object sensor devices 102 may capture and send vehicle sensor data related to laser returns from physical objects in the area surrounding the vehicle 100, while traveling at a velocity $V_{100}$, along a vehicle travel path 134.

The object sensor devices 102 may operate to realize moving and non-moving objects in or adjacent to the vehicle travel path 134. Though the vehicle 100 may at the moment be in a manual mode, the vehicle control unit 110 may continue to monitor for objects within a vehicle travel path 134, more so when the vehicle travel path 134 includes a heightened travel hazard level (such as when engaging in a passing maneuver).

When at a heightened travel hazard level, object sensor devices 102-7 and/or 102-8 may also be raised and/or further elevated above a vehicle roof-line to function to capture data relating to lateral and/or longitudinal gaps for collision mitigation.

Also, object sensor devices 102 may each operate at different sensing levels with respect to different vehicle operation modes. For example, one or all of the object sensor devices 102-1 to 102-6 may operate at an active sensing mode that has increased sampling rate, at an enhanced range, of the vehicle environment 116, and correspondingly, increased data capture for processing by vehicle computer devices, such as the vehicle control unit 110. An active sensing mode may engage upon increasing uncertainty in the vehicle environment 116 (such as multiple moving objects, congestion, etc.).

On the other hand, one or all of the object sensor devices 102-1 to 102-6 may operate at an oversight sensing mode, in which a lower sampling rate at a closer range may be used with the vehicle environment 116 (such as few moving objects, lower congestion, less variation in speed, etc.). As may be appreciated, one or all of the object sensor devices 102-1 to 102-6 may operate at an active sensing mode and/or an oversight sensing mode to provide a monitoring function, in which the vehicle control unit may operate to monitor for an object within the vehicle travel path 134, where the vehicle travel path includes a heightened travel hazard level.

The object sensor devices 102 may be provided by a Light Detection and Ranging (LIDAR) system, in which the object input devices 102 may capture data related laser light returns from physical objects in the environment 116 of the vehicle 100. The object sensor devices 102 may also include a combination of lasers (LIDAR) and milliwave radar devices. LIDAR and radar based devices may operate to sense objects along with a velocity (that is, relative and/or absolute velocities) of objects.

As may be appreciated, however, vehicle perception systems, in general, include tradeoffs due to sensor device processing capabilities and/or limitations as applied in real-world application. For example, radar devices may not include sufficient resolution to sense whether lateral gaps across a traffic lane are sufficiently wide to receive the vehicle 100. Camera sensor devices may be limited in low-light and/or adverse ambient conditions (for example, rain, dust, snow, etc.). Among the various sensor devices, LiDAR-based components may provide the suitable functionality for general object detection, gap detection, and prompting collision mitigation maneuvers.

For example, LiDAR-based components may provide sub-meter lateral resolution and can have a sensor range extending past 80-meters. With these operational parameters, a one-to-two second window can be realized to mitigate a collision. That is, within this one-to-two second window, an autonomous override of a manual mode of vehicle operation may occur to mitigate a collision with an object detected in the vehicle travel path 134 (such as when passing a vehicle in an opposing traffic lane).

Generally, the LiDAR-based component provides a point cloud data representation of numerous (i.e., thousands) return signals. The accuracy, or distance, of the object of each data point is considered fairly high (so that the relative distance of to a detected object may be ascertainable). However, the cumulative point cloud data may be considered to have a low resolution (for example, whether an "object" is one or many vehicles at a range distance limit may not be readily discernible without extensive data processing time). But as object approach, or "closes", on the sensor device, individual objects may be detected, though not readily identifiable. In this respect, LiDAR components may be considered as providing low resolution sensor device data, though the accuracy with respect to the range for detection of each data point may provide for collision mitigation.

As the term is used, "heightened travel hazard level" may be considered to include those vehicle maneuvers outside of common, or baseline, vehicle operations (such as, a vehicle travel path 134 based on traveling within a traffic lane with a traffic flow towards a destination objective). Examples of a vehicle travel path that includes a heightened travel hazard level may be one of moving against a flow of traffic (such as being in an opposing traffic lane while passing a vehicle), of traveling on roadway lanes or regions outside of customary vehicle travel paths (such as, a parking lane, a sidewalk, a bicycle lane, a road shoulder, etc.), and/or traveling on portions of a roadway in which a heightened travel hazard level may be a characteristic (such as, construction zones, unimproved roads, etc.).

As noted, the vehicle 100 may be capable of operating in various operational modes, such as an autonomous mode, a driver-assist mode, and/or a manual mode. The device and method described herein relate to an autonomous override decision over a vehicle operator for mitigating a collision.

In an autonomous mode, a computing device, such as the vehicle control unit 110, may be used to control one or more of the vehicle systems without the vehicle user's direct intervention. In a driver-assist mode, operation of the vehicle 100 can be shared between the vehicle operator and a computing device, such as the vehicle control unit 110. For example, the vehicle operator can control certain aspects of the vehicle operation, such as steering, while the computing device can control other aspects of the vehicle operation, such as braking and acceleration.

When the vehicle 100 may be operating in an autonomous (or driver-assist) mode, the computing device may be operable to issue commands to the various vehicle systems to direct their operation, rather than such vehicle systems being controlled by vehicle user input.

In the manual mode, a vehicle operator manually controls the systems of the vehicle 100. The vehicle systems may include a powertrain and/or propulsion system, a steering system, a stability control system, a navigation system, an energy system, and any other systems that can control various vehicle functions (such as the vehicle climate or entertainment functions, etc.).

In either manual, autonomous, and/or driver-assist modes of operation under low-light conditions, the object sensor devices 102 may detect obstructions that the vehicle operator (or occupant) may not otherwise be aware of until on top of it, and may not be otherwise able to take action to avoid. In the operation of the method and device described herein, the sensor devices 102 may detect an object within the vehicle travel path 134, which may include a heightened travel hazard level. Accordingly, the autonomous capability of the vehicle may operate to mitigate a collision with the object, which is discussed in detail with respect to FIGS. 2-7.

Figure 2:
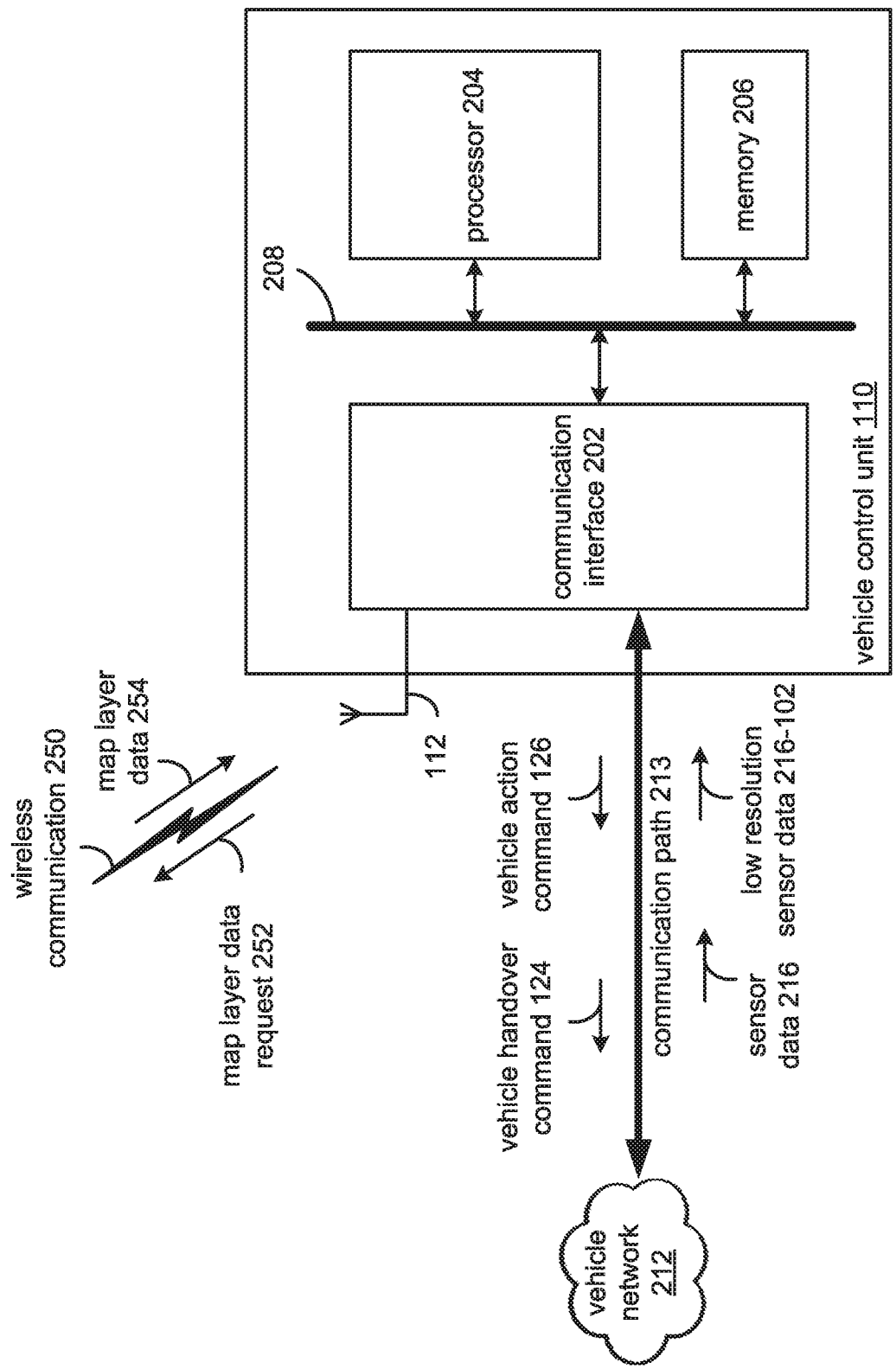
FIG. 2 illustrates a block diagram of the vehicle control unit of FIG. 1.

FIG. 2 illustrates a block diagram of a vehicle control unit 110 of FIG. 1. The vehicle control unit 110, which includes a wireless communication interface 202, a processor 204, and memory 206, that are communicably coupled via a bus 208. The vehicle control unit 110 may provide an example platform for the device and methods described in detail with reference to FIGS. 1-7.

The processor 204 can be a conventional central processing unit or any other type of device, or multiple devices, capable of manipulating or processing information. As may be appreciated, processor 204 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory (and/or memory element) 206 may be communicably coupled to the processor 204, and may operate to store one or more modules described herein. The modules can include instructions that, when executed, cause the processor 204 to implement one or more of the various processes and/or operations described herein.

The memory and/or memory element 206 may be a single memory device, a plurality of memory devices, and/or embedded circuitry of the processor 204. Such a memory device may be a read-only memory, random access memory, volatile memory, non-volatile memory, static memory, dynamic memory, flash memory, cache memory, and/or any device that stores digital information. Furthermore, arrangements described herein may take the form of a computer program product embodied in one or more computer-readable storage medium having computer-readable program code embodied, e.g., stored, thereon. Any combination of one or more computer-readable media may be utilized. The computer-readable medium may be a computer-readable signal medium or a computer-readable storage medium.

The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device. Program code embodied on a computer-readable medium may be transmitted using any appropriate medium, including but not limited to wireless, wireline, optical fiber, cable, RF, etc., or any suitable combination of the foregoing.

The memory 206 is capable of storing machine readable instructions, or instructions, such that the machine readable instructions can be accessed and/or executed by the processor 204. The machine readable instructions can comprise logic or algorithm(s) written in programming languages, and generations thereof, (e.g., 1GL, 2GL, 3GL, 4GL, or 5GL) such as, for example, machine language that may be directly executed by the processor 204, or assembly language, object-oriented programming (OOP) such as JAVA, Smalltalk, C++ or the like, conventional procedural programming languages, scripting languages, microcode, etc., that may be compiled or assembled into machine readable instructions and stored on the memory 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 204 includes more than one processing device, the processing devices may be centrally located (e.g., directly coupled together via a wireline and/or wireless bus structure) or may be distributed located (e.g., cloud computing via indirect coupling via a local area network and/or a wide area network). Further note that when the processor 204 implements one or more of its functions via a state machine, analog circuitry, digital circuitry, and/or logic circuitry, the memory and/or memory element storing the corresponding operational instructions may be embedded within, or external to, the circuitry including the state machine, analog circuitry, digital circuitry, and/or logic circuitry.

Still further note that, the memory 206 stores, and the processor 204 executes, hard coded and/or operational instructions of modules corresponding to at least some of the steps and/or functions illustrated in FIGS. 1-7.

The vehicle control unit 110 can include one or more modules, at least some of which are described herein. The modules may be considered as functional blocks that can be implemented in hardware, software, firmware and/or computer-readable program code that perform one or more functions. A module, when executed by a processor 204, implements one or more of the various processes described herein. One or more of the modules can be a component of the processor(s) 204, or one or more of the modules can be executed on and/or distributed among other processing systems to which the processor(s) 204 is operatively connected. The modules can include instructions (e.g., program logic) executable by one or more processor(s) 204.

The wireless communication interface 202 generally governs and manages the data received via a vehicle network 212. There is no restriction on the present disclosure operating on any particular hardware arrangement and therefore the basic features herein may be substituted, removed, added to, or otherwise modified for improved hardware and/or firmware arrangements as they may develop.

The antenna 112 may include one or more conductive elements that interact with electromagnetic signals transmitted by global positioning system satellites. The received signals may be transformed into a data signal indicative of the location (for example, latitude and longitude positions), and further indicative of the positioning of the vehicle with respect to road data.

The vehicle control unit 110 may be communicatively coupled to receive signals from global positioning system satellites, such as via the antenna 112 of the vehicle control unit 110, or other such vehicle antennae (not shown). The antenna 112 operates to provide communications with the vehicle control unit 110 through wireless communication 250.

Wireless communication 250 may operate to convey a map layer data request 252 to a server via a network cloud. The server may include third party servers that are associated with applications that run and/or executed via the vehicle control unit 110. For example, map data layers may be executing on the vehicle control unit 110, and may further include GPS location data to identify the location of the vehicle 100 in a graphic map display relative to a roadway.

In response to the map layer data request 252, map layer data 254 may be provided via the wireless communication 250. The map layer data 254 may include roadway information data, traffic layer data, geolocation layer data, etc. Layer data may be provided in a Route Network Description File (RNDF) format.

A Route Network Description File specifies, for example, accessible road segments and provides information such as waypoints, stop sign locations, lanes, lane widths, checkpoint locations, and parking spot locations. The route network has no implied start or end point. Such information may be implemented to identify a vehicle travel path that includes a heightened travel hazard level, such as when the vehicle travel path enters an opposing traffic lane, as well as regions of the roadway having a heightened travel hazard level (such as lanes designated for parking, sidewalks, bicycle lanes, road shoulders, construction zones, etc.).

The wireless communication 250 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, Zig-Bee, and/or variations thereof.

As may be appreciated, the communication path 213 of the vehicle network 212 may be formed from a medium suitable for transmitting a signal such as, for example, conductive wires, conductive traces, optical waveguides, or the like. Moreover, the communication path 213 can be formed from a combination of mediums capable of transmitting signals.

The communication path 213 may include a combination of conductive traces, conductive wires, connectors, and buses that cooperate to permit the transmission of electrical data signals to components such as processors, memories, sensors, input devices, output devices, and communication devices.

Accordingly, the communication path 213 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle 100.

The term "signal" may be understood to relate to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

Respective modules of the vehicle control unit 110, and associated instructions, when executed by the processor 204, cause the processor 204 to receive vehicle sensor data 216 from object sensor devices 102 (FIG. 1), and produce, at least based in part on the vehicle sensor data 216, such as low resolution sensor data 216-102, a vehicle handover command 124, and an autonomous vehicle action command 126, as is discussed in detail with reference to FIGS. 3-7.

Figure 3:
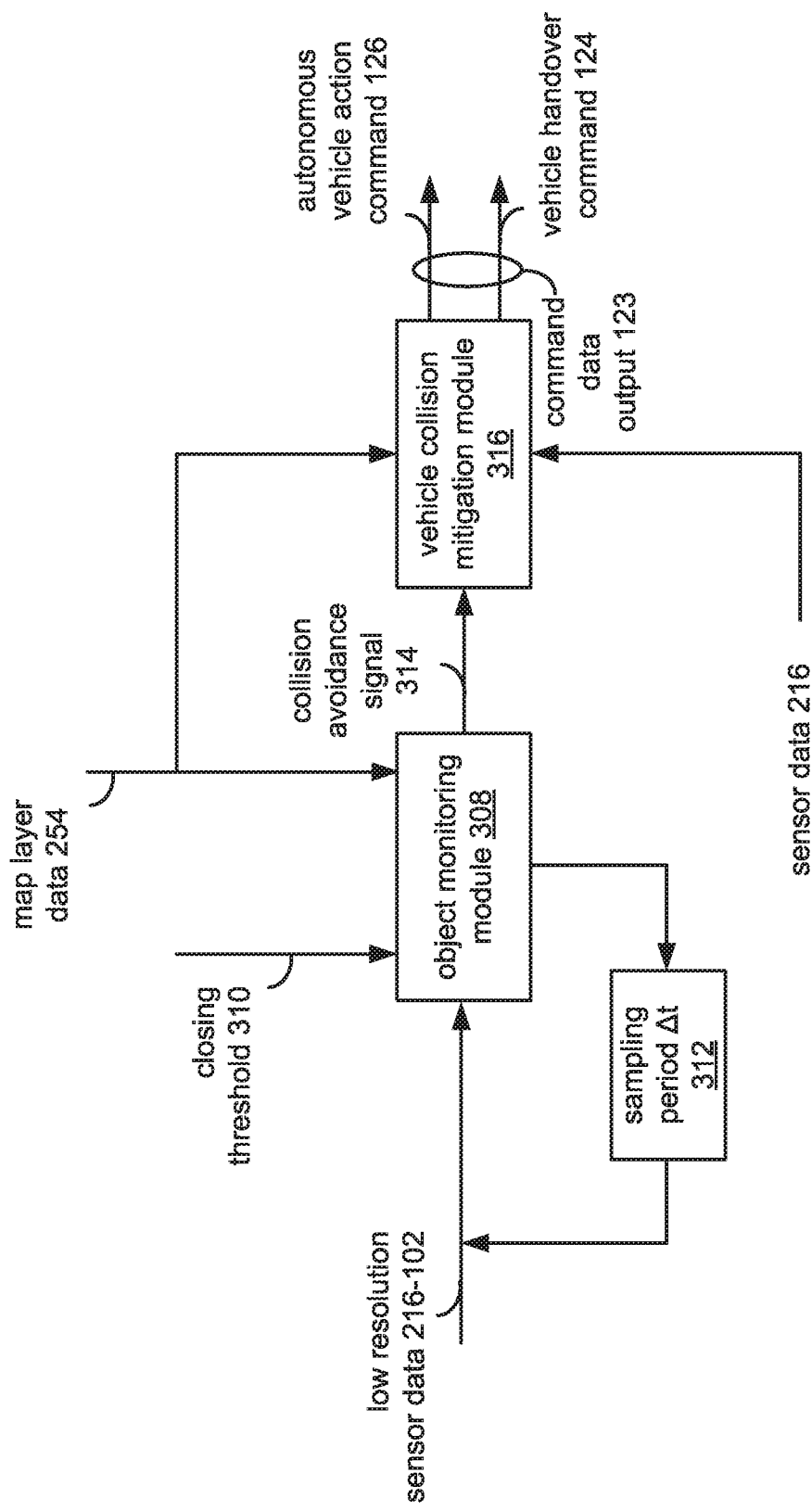
FIG. 3 illustrates a functional module block diagram stored in a memory of the vehicle control unit of FIG. 2.

FIG. 3 illustrates a functional module block diagram stored in a memory 206 for the vehicle control unit 110, where memory 206 may store a object monitoring module 308 and a vehicle collision mitigation module 316.

The object monitoring module 308 includes instructions that, when executed by the processor 204, cause the processor 204 to monitor low resolution sensor device data 216-102, such as may be provided by may be provided by a Light Detection and Ranging (LIDAR) system, of at least one of the plurality of sensor devices 102 for an object within a vehicle travel path 134 (FIG. 1) including a heightened travel hazard level. As may be appreciated, the object monitoring module 308 may identify a heightened travel hazard level from map layer data 254. Map layer data 254 include travel path portions identifiable as heightened travel hazard levels, such as an opposing traffic lane, a parking lane, a sidewalk, a bicycle lane, a road shoulder, a construction zone, etc.

Upon detection of the object within the vehicle travel path 134 (FIG. 1), a closing distance rate relative to the object may be compared with a closing threshold 310. The closing threshold 310 may be based on a lookup table populated by traffic safety statistics, or algorithms relating vehicle operational parameters (for example, vehicle model braking rate, braking stability, weight, etc.). In this respect, the closing threshold 310 may relate a closing distance rate of the vehicle 100 to a vehicle collision probability. For example, the greater a closing distance rate, a corresponding probability of a vehicle collision may apply. For a travel path that includes a heightened travel hazard level, the probability of a vehicle collision may be enhanced, prompting an enhancement factor to the probability of a vehicle collision. Other values, such as fuzzy logic values, may be implemented to a closing threshold 310, such as "manageable," "likely unmanageable," "highly unmanageable," etc.

As may be appreciated, the closing distance rate may be based on the low resolution sensor data 216-102. When the closing distance rate compares unfavorably with the closing threshold 310, produce a collision avoidance signal 314 to the vehicle collision mitigation module 316.

The vehicle collision mitigation module 316 includes instructions that, when executed by the processor 204 (FIG. 2), cause the processor 204 to produce, in response to the collision avoidance signal 314, command data output 123 that includes a handover command 124 and an autonomous vehicle action command 126. As may be appreciated, the handover command 124 and the autonomous vehicle action command 126 may be formed as independent and discrete commands, or as a combinational command (such as a data message class format operating to embody the vehicle handover command 124 to override manual control to autonomous control, with the autonomous operation being defined by an autonomous vehicle action command 126).

The handover command 124 may operate to initiate a vehicle control handover from a vehicle operator to an autonomous operational mode for transmission via the wireless communication interface 202.

The vehicle collision mitigation module 316 also includes instructions that, when executed by the processor 204 (FIG. 2), cause the processor 204 to determine a secondary vehicle travel path based on the closing distance rate to produce a determined secondary vehicle travel path, as is discussed by way of example with respect to FIGS. 4 through 7. As may be appreciated, the object monitoring module 308 may be operable to generate options for a secondary vehicle travel path prior to an unfavorable comparison with the closing threshold 310. Data and/or data locations that relate to the options for the secondary vehicle travel path may provided with the collision avoidance signal 314, or may be accessible from the memory 206 at a pre-defined static memory location.

In this respect, assessment and/or reassessment of the vehicle environment 116 (FIG. 1) via sensor data 216 can be minimized by the vehicle collision mitigation module 316 in determining a secondary vehicle travel path. The vehicle collision mitigation module 316 may process sensor data 216 (including sensor data 216-102), and map layer data 254 to corroborate and/or verify availability of potential options for the secondary vehicle travel path to mitigate a vehicle collision.

The vehicle collision mitigation module 316 also further includes instructions that, when executed by the processor 204 (FIG. 2), cause the processor 204 to generate a vehicle action command 126 operable to autonomously engage the determined secondary vehicle travel path for transmission via the wireless communication interface 202.

As may be appreciated, the determined secondary vehicle travel path functions to mitigate the closing distance rate. The determined secondary vehicle travel path relayed via the autonomous vehicle action command 126 may include, for example, an adjacent traffic lane defining an available gap (that is, a longitudinal and/or lateral gap) for receiving a vehicle, an adjacent region defining the available gap for receiving the vehicle, an adjacent traffic lane defining an unavailable gap for receiving the vehicle, or an adjacent region defining the unavailable gap for receiving the vehicle.

Also, the autonomous vehicle action command 126 may include instructions to autonomously engage the determined secondary travel path by autonomously adjusting a vehicle acceleration based on the determined secondary travel path, and autonomously adjusting a vehicle heading based on the determined secondary travel path. As may be appreciate, a vehicle objective of the determined secondary vehicle path includes a gap that may receive the vehicle 100. In the alternative, should no gap (lateral and/or longitudinal) be available, a gap having a closest fit with the vehicle 100 may be opted to mitigate the vehicle collision.

Figure 4:
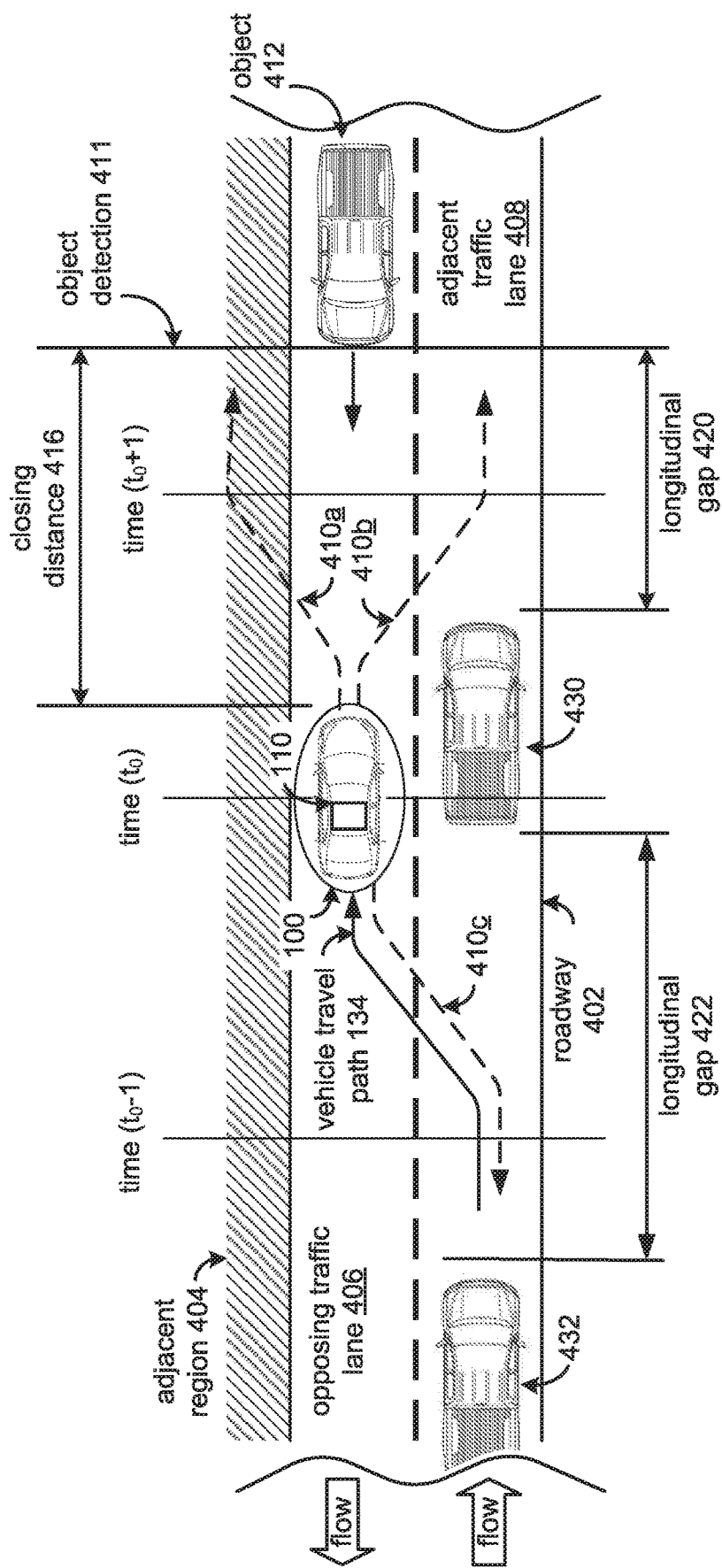
FIG. 4 illustrates an example vehicle collision mitigation upon detecting an object within a vehicle travel path that includes a heightened travel hazard level.

FIG. 4 illustrates an example vehicle collision mitigation upon detecting an object within a vehicle travel path 134 including a heightened travel hazard level. In the example of FIG. 4, includes a roadway 402, having an adjacent region 404 (such as a vehicle shoulder), an opposing traffic lane 406 with an opposing traffic flow to an adjacent traffic lane 408.

As may be appreciated, map layer data 254 may be retrieved via the vehicle control unit 110 (FIG. 2). Map layer data 254 may include roadway information data, traffic layer data, geolocation layer data, etc., which may be provided in a Route Network Description File (RNDF) format. A Route Network Description File specifies, for example, accessible road segments and provides information such as waypoints, stop sign locations, lanes, lane widths, checkpoint locations, and parking spot locations. The route network has no implied start or end point.

Information from a RNDF may be used by the vehicle control unit 110 to implement and/or identify a vehicle travel path 134 with respect to the physical embodiment of the roadway 402, and whether the vehicle travel path 134 includes heightened travel hazard level, such as when the vehicle travel path enters an opposing traffic lane 406, as well as regions of the roadway 402 having a heightened travel hazard level (such as lanes designated for parking, sidewalks, bicycle lanes, road shoulders, construction zones, etc.).

For simplicity and clarity, the example roadway 402 is a two lane roadway with opposing lanes of travel 406 and 408. The vehicle 100 may operate in a driver-assist or a manual mode, which may involve a human-error component to either of the operational modes.

In the example, the vehicle operator of vehicle 100 attempts to pass a leading vehicle 430, taking the vehicle travel path 134 into the opposing traffic lane 406. The vehicle control unit 100, via the map layer data 254, may identify the vehicle travel path 134 as including a heightened travel hazard level.

The vehicle control unit 110 may operate by monitoring for an object within the vehicle travel path 134. For reference, the vehicle control unit 110 may consider a present state as being at a present time, time $t_0$. Because the vehicle 100 is in the opposing traffic lane 406, the vehicle travel path 134 includes a heightened travel hazard level. Upon detecting an object 412 at object detection 411, such as a vehicle traveling with the respective flow of the opposing traffic lane 406, the vehicle control unit 110 may compare a closing distance rate relative to the object 412 with a closing threshold. The closing distance rate may correspond to the rate of change in a closing distance 416 from the vehicle 100 to the object detection 411 over time (that is, distance per time).

The closing threshold 310 (FIG. 3), may be based on a lookup table populated by traffic safety statistics, or algorithms relating vehicle operational parameters (for example, vehicle model braking rate, braking stability, weight, etc.). In this respect, the closing threshold 310 may relate a closing distance rate of the vehicle 100 to a vehicle collision probability. In general, vehicles that may be in a driver-assist or manual mode of operation are subject to driver judgment. In passing scenarios, a vehicle operator may tend to misjudge the closing distance 416 with an approaching vehicle, such as object 412. In such instances, the vehicle control unit 110 may take control of the vehicle and operate to mitigate a vehicle collision. In such instances, the autonomous mitigation may operate within one-to-two seconds to provide a collision mitigation function.

Human nature may consider that success in completing the passing maneuver relies in part on a misjudged hope and/or guess that an oncoming vehicle, such as object 412, may slow down or itself divert, allowing vehicle 100 to successfully complete the maneuver to occupy longitudinal gap 420. The underlying logic, however, is that the opposing vehicle is under the control of an attentive human operator with better judgment.

Accordingly, when the closing distance rate compares unfavorably with the closing threshold, the vehicle control unit 100 may determine a secondary vehicle travel path based on the closing distance rate to produce a determined secondary vehicle travel path. For example, multiple options and/or scenarios of secondary vehicle travel paths 410a, 410b and 410c may be generated. The example secondary travel paths 410a, 410b and 410c may function to mitigate the closing distance rate by diverting and/or decelerating the vehicle 100 with respect to the closing distance 416.

Determining a secondary travel path may include identifying a longitudinal gap defined by a pair vehicles, such as either vehicle 430 and 432, or vehicle 430 and object 412 (that is, the opposing vehicle). The longitudinal gaps 422 and 420 may be identified via object sensor devices 102. The longitudinal gaps 422 and 420 are in a non-opposing direction-of-travel and adjacent to the vehicle travel path 134. A length of the longitudinal gaps 420 and 422 are compared with an availability threshold (such as the length of the vehicle 100 with a buffer amount).

When the length of the longitudinal gap 420 compares unfavorably with the availability threshold, the vehicle control unit operates to generate a command for autonomously engaging a vehicle deceleration to produce an affected closing distance rate. The affected closing distance rate is compared with the closing threshold, and when the affected closing distance rate compares unfavorably with the closing threshold, the determined vehicle secondary travel path 410c may be engaged to intercept longitudinal gap 422 behind vehicle 430 and in front of vehicle 432.

As may be appreciated, circumstances may produce a singular option for a secondary vehicle travel path, while other circumstances (such as traffic volume, tail-gating, etc.) may produce additional secondary vehicle travel paths 410a, 410b and 410c of FIG. 4.

A secondary vehicle travel path may include various path options, which relate to a future position at a time $(t_0+1)$ for the vehicle 100. For example, secondary travel path 410a may include an adjacent region 404 (such as a roadway shoulder, improved or unimproved) defining the available longitudinal gap 420 for receiving the vehicle 100. Secondary vehicle travel path 410b may include an adjacent traffic lane 408 defining an available longitudinal gap 420 for receiving the vehicle 100. Secondary vehicle travel path 410c may include an adjacent traffic lane 408 defining an available longitudinal gap 422 with a deceleration of vehicle 100 via the vehicle control unit 110. In the event only unavailable longitudinal gaps are present (such as congested roadways, etc.), the vehicle control unit 110 may opt for a secondary vehicle travel path 134 with an unavailable longitudinal gap to mitigate the effects of a full-impact head-on collision.

With longitudinal gap 422 available, secondary vehicle travel path 410c may be considered a more conservative alternative of the options, then secondary travel path 410b, and then secondary travel path 410a (into an adjacent region 404, of the options. Upon determining a secondary vehicle travel path, the vehicle control unit 110 may autonomously engage the determined secondary vehicle travel path, which in the example of FIG. 4, being one of the secondary vehicle travel paths 410a, 410b and 410c.

The autonomous engagement may be based on a command data output 123 of the vehicle control unit 110, which may include a vehicle handover command 124 to change control to the vehicle control unit 110, and an autonomous vehicle action command 126 including powertrain, steering, navigation, etc., commands to engage the secondary vehicle travel path. In this manner, the vehicle 100 overrides the judgment of a vehicle operator in mitigating a vehicle collision, either by avoiding a head-on collision, or by avoiding a collision altogether.

FIG. 5 illustrates a sensor device resolution graph 500. The sensor device resolution graph 500 may include a horizontal axis relating a closing distance $x(t)$ of a vehicle 100 with an object 512. The graph 500 may also include to a vertical axis relating to sensor resolution error 520.

As noted earlier, vehicle perception systems, in general, include tradeoffs due to sensor device processing capabilities and/or limitations as applied in real-world application. For example, radar devices may not include sufficient resolution to sense whether lateral gaps within a traffic lane (and across the vehicle 100) are wide enough to receive the vehicle 100. Camera sensor devices may be limited in low-light and/or adverse ambient conditions (for example, rain, dust, snow, etc.). Among the various sensor devices, LiDAR-based components may provide the suitable functionality for general object detection, gap detection, and prompting collision mitigation maneuvers.

For example, LiDAR-based components may provide sub-meter lateral resolution and can have a sensor range extending past 80-meters. With these operational parameters, a one-to-two second window can be realized to mitigate a collision with the distance accuracy and improved resolution of a low resolution sensor device, such as that of object sensor devices 102 (FIG. 1), which may be provided via LiDAR-based sensor devices. That is, within this one-to-two second window, an autonomous override of a manual mode of vehicle operation may occur to mitigate a collision with an object detected in the vehicle travel path (such as when passing a vehicle in an opposing traffic lane).

Generally, the LiDAR-based component provides a point cloud data representation of numerous (i.e., thousands) return signals. The accuracy, or distance, of the object of each data point is considered fairly high (so that the relative distance of to a detected object may be ascertainable). However, the cumulative point cloud data may be considered to have a low resolution (for example, whether an "object" is one or many vehicles at a range distance limit may not be readily discernible without extensive data processing time). But as object approach, or "closes", on the sensor device, individual objects may be detected, though not readily identifiable such as at a closing distance $x(t_0-1)$, but becoming distinguishable as the error 512 decreases with the decreasing closing distance $x(t)$ (as well as to distance $x(t_0+1)$).

In other words, the graph 500 correlates an increasing precision level as a potential for collision may increase, or the closing distance $x(t)$ goes to zero. For example, in a two-lane road, the vehicle's travel route the opposing traffic lane. Though the sensor device(s) may detect the distance to a detected object, the corresponding lower resolution at distance may construe the opposing vehicle and an adjacent vehicle, without any gap between the two vehicles. As the distance reduces, the sensor resolution improves, so that accuracy of estimating the gap, or distance between the two vehicles may be discerned. A trajectory re-computation (such as trajectories to avoid and/or mitigate a collision) can readily be done, at a higher precision to not only take into consideration longitudinal gaps alongside the vehicle, as well as lateral gaps (that is, across the autonomous-capable vehicle) defined between an approaching vehicle and another adjacent to that approaching vehicle (which may be traveling in an opposing direction).

FIG. 6 illustrates an example vehicle collision mitigation upon detecting an object 512 within a vehicle travel path 134 including a heightened travel hazard level. As with respect to the graph 500 of FIG. 5, sensor resolution may apply with respect to longitudinal gap 620 and lateral gap 624. In an example passing maneuver being manually engaged by a vehicle operator, the vehicle 100, via a method and/or process executable via the vehicle control unit 110, may discern the nature of longitudinal gap 620, such as that between vehicle 630 and 634 of the adjacent traffic lane 408, and the nature of a lateral gap 624, such as that between the vehicle 634 of the adjacent traffic lane 408 and the oncoming (or stationary) object 512.

As noted, at a closing distance $x(t_0-1)$, a sensed lateral gap 624 may not be detectable because the resulting point cloud may be construed to relate to one continuous object, though object 512 and vehicle 634 are not one continuous object. At a closing distance $x(t_0-1)$, the sensed lateral gap 624 may come into "focus" and/or detectable because the resulting point cloud senses the void between the object 512, and the vehicle 634.

As may be appreciated, the sensed lateral gap 624 may come into "focus" earlier based on sensor positioning. For example, the vehicle control unit 110 of the vehicle 100 may be configured to detect traffic conditions, including the sensed lateral gap 624 and/or longitudinal gap 620, using an elevated perception system to provide earlier autonomous vehicle action command(s) 126. In collision mitigation and/or avoidance, creating longer reaction-time buffers can aid in minimizing and possibly eliminating damage to person and/or property.

The secondary vehicle path 610, upon a rate of the closing distance 616 exceeds, or compares unfavorably, with a closing threshold, may include as an objective the sensed lateral gap 624. As may be appreciated, a command data output may handover vehicle control from the vehicle operator to the vehicle control unit 110. In this respect, the vehicle control unit 110 may operate to mitigate a probable condition by placing the path objective to the sensed lateral gap 624 or the longitudinal gap 620. In this example, the longitudinal gap 620 and the sensed lateral gap 624 may be insufficient to receive the vehicle 100 without incident—that is, each gap may be unavailable, but may be a region defined with the secondary vehicle travel path 610 for receiving the vehicle 100. In this regard, a head-on collision may be mitigated with the object 512 with either of the unavailable longitudinal gap 620 and the unavailable sensed lateral gap 624.

In the alternative, in manual control, a vehicle operator may "freeze," panic, or deviate the vehicle 100 that may exacerbates the likelihood of collision, or may result in a head-on collision at the combined relative velocities. Accordingly, the embodiments discussed herein are directed towards collision mitigation under circumstances prompted by operator error and/or mistake, and in a given circumstances, may operate to autonomously mitigate the nature of a collision (that is, one other than a head-on collision) and/or mitigate the collision through collision avoidance.

Figure 7:
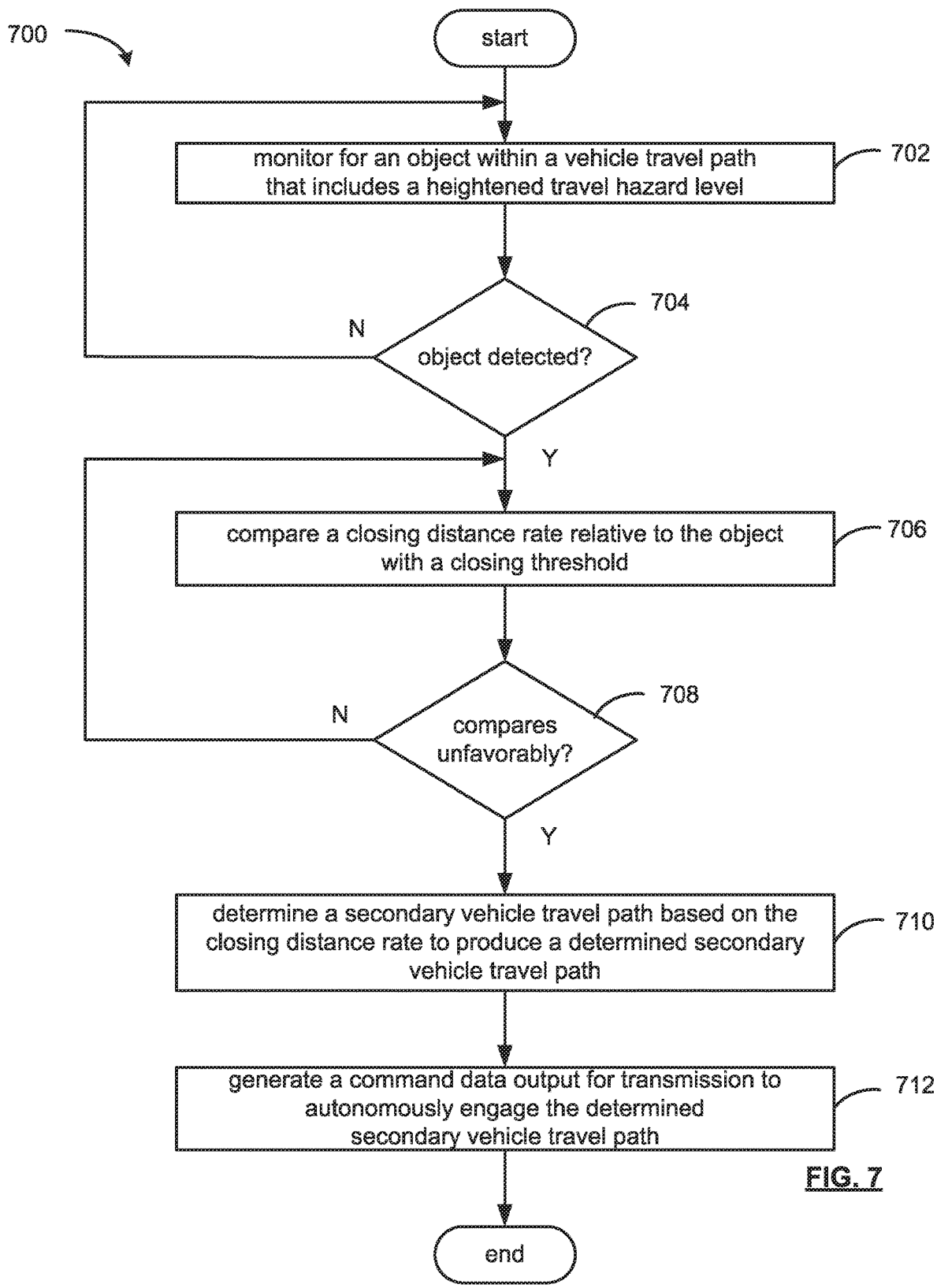
FIG. 7 shows an example process for mitigating a vehicle collision.

FIG. 7 shows an example process 700 for mitigating a vehicle collision for a vehicle travel path that includes a heightened travel hazard level.

At operation 702, the vehicle travel path includes a heightened travel hazard level, such as an opposing traffic lane, a parking lane, a sidewalk, a bicycle lane, a road shoulder, a construction zone, etc. A vehicle control unit, receiving object sensor device data (such as a low-resolution device, which may include one or more LiDAR based sensor devices), may operate to monitor for an object within the vehicle travel path. When, at operation 704, an object is detected (such as an oncoming vehicle, a pedestrian crossing in front of the vehicle, a bicyclist, etc.), a closing distance rate of the vehicle, via the sensor devices, relative to the object is compared with a closing threshold.

The closing distance rate may correspond to the rate of change in a closing distance of the vehicle 100 to the object over time (that is, distance per time). The closing threshold may be based on a lookup table populated by traffic safety statistics, or algorithms relating vehicle operational parameters (for example, vehicle model braking rate, braking stability, weight, etc.). In this respect, the closing threshold may relate a closing distance rate of the vehicle to a vehicle collision probability, which in the present example relates to a head-on collision.

In general, vehicles that may be in a driver-assist or manual mode of operation are subject to driver judgment. In passing scenarios, a vehicle operator may tend to misjudge the closing distance with an approaching vehicle, such as the object detected by operation 704.

When the closing distance rate compares unfavorably with the closing threshold at operation 708, a secondary vehicle travel path may be determined at operation 710. Multiple secondary vehicle travel paths may be considered within the brief time allotted (for example, one-to-two seconds).

A secondary vehicle travel path based on the closing distance rate to produce a determined secondary vehicle travel path that function to mitigate the closing distance rate by diverting and/or decelerating the vehicle with respect to a closing distance with the object.

A secondary vehicle travel path may include various path options, which relate to a future position at a time $(t_0+1)$ for the vehicle 100. For example, one secondary travel path may include an adjacent region (such as a roadway shoulder, improved or unimproved) that defines an available gap for receiving the vehicle 100. Another secondary vehicle travel path may include an adjacent traffic lane defining an available gap ahead of the vehicle being passed for receiving the vehicle 100. Yet another secondary vehicle travel path may include an adjacent traffic lane defining an available gap (longitudinal and/or lateral) behind the vehicle sought to be passed, accompanied with a deceleration.

In the event when only unavailable lateral gaps are present (such as congested roadways, etc.), the secondary vehicle travel path, when based on the closing distance rate to produce a determined secondary vehicle travel path, may take this option of intercepting an otherwise unavailable lateral gap to otherwise mitigate the effect of a generally-certain head-on vehicle collision.

At operation 712, a command data output may be generated for transmission to autonomously engage the determined secondary vehicle travel path. The command data output can include a handover command and an autonomous vehicle action command. As may be appreciated, the handover command and the autonomous vehicle action command may be formed as independent and discrete commands, or as a combinational command (such as a data message class format operating to embody the vehicle handover command to override manual control to autonomous control, with the autonomous operation to engage the determined secondary vehicle travel path being defined by the autonomous vehicle action command).

Detailed embodiments relating to mitigating a vehicle collision are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences.

As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled."

As one of ordinary skill in the art will further appreciate, the term "compares favorably," as may be used herein, indicates that a comparison between two or more elements, items, signals, et cetera, provides a desired relationship, while the term "compares unfavorably," indicates that a comparison between two or more elements, items, signals, et cetera, provides an undesired relationship.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage medium, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable medium having computer-readable program code embodied, e.g., stored, thereon. Any combination of one or more computer-readable media may be utilized. The computer-readable medium may be a computer-readable signal medium or a computer-readable storage medium.

Program code embodied on a computer-readable medium may be transmitted using any appropriate medium, including but not limited to wireless, wireline, optical fiber, cable, RF, etc., or any suitable combination of the foregoing.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for mitigating a vehicle collision, the method comprising:
    monitoring for an object within a vehicle travel path;
    upon detecting the object within the vehicle travel path, comparing a closing distance rate relative to the object with a closing threshold;
    when the closing distance rate does not exceed the closing threshold, determining a plurality of optional secondary vehicle travel paths of the vehicle originating from a current location of the vehicle;
    determining, from the plurality of optional secondary vehicle travel paths, a secondary vehicle travel path to produce a determined secondary vehicle travel path which functions to mitigate the closing distance rate, the determined secondary vehicle travel path including an adjacent traffic lane defining an unavailable gap for receiving the vehicle; and
    when the closing distance rate exceeds the closing threshold, generating a command data output for transmission to autonomously engage the determined secondary vehicle travel path.

2. The method of claim 1, wherein the autonomously engaging the determined secondary travel path further comprises:
    autonomously adjusting a vehicle acceleration based on the determined secondary travel path; and
    autonomously adjusting a vehicle heading based on the determined secondary travel path.

3. The method of claim 1, wherein the determined secondary vehicle travel path includes either a lateral gap or a longitudinal gap as a vehicle objective.

4. A method for mitigating a vehicle collision, the method comprising:
    monitoring, via low resolution sensor device data, for an object within a vehicle travel path of a vehicle;
    upon detecting an object within the vehicle travel path, comparing a closing distance rate relative to the object with a closing threshold;
    when the closing distance rate does not exceed the closing threshold, determining a plurality of optional secondary vehicle travel paths of the vehicle originating from a current location of the vehicle;
    determining, from the plurality of optional secondary vehicle travel paths, a secondary vehicle travel path to produce a determined secondary vehicle travel path, wherein the determined secondary travel path functions to mitigate the closing distance rate, the determined secondary vehicle travel path including an adjacent traffic lane defining an unavailable gap for receiving the vehicle;
    when the closing distance rate exceeds the closing threshold:
        initiating a vehicle control handover to an autonomous operational mode; and
        autonomously engaging the determined secondary vehicle travel path.

5. The method of claim 4, wherein the determining the secondary travel path further comprises:
    identifying a first gap defined by a pair of neighboring vehicles adjacent to the vehicle travel path;
    when the length of the first gap is less than a length of the vehicle:
        autonomously engaging a vehicle deceleration to produce an affected closing distance rate; and
        comparing the affected closing distance rate relative to the object with the closing threshold;

when the affected closing distance rate exceeds the closing threshold:
determining the secondary vehicle travel path to intersect with a second gap to
produce the determined secondary vehicle travel path.

6. The method of claim 4, wherein the determined secondary vehicle travel path further includes at least one of:
an adjacent traffic lane defining a second gap as being available for receiving a vehicle;
an adjacent region defining the second gap as being available for receiving the vehicle; and
the adjacent region defining the second gap as being unavailable for receiving the vehicle.

7. The method of claim 4, wherein the autonomously engaging the determined secondary travel path further comprises:
autonomously adjusting a vehicle acceleration based on the determined secondary travel path; and
autonomously adjusting a vehicle heading based on the determined secondary travel path.

8. The method of claim 4, wherein the determined secondary vehicle travel path includes a lateral gap adjacent to the object as an objective.

9. A vehicle control unit comprising:
a communication interface to service communication with a vehicle network;
a processor communicably coupled to the communication interface and a plurality of sensor devices; and
memory communicably coupled to the processor and storing:
an object monitoring module including instructions that, when executed by the processor, cause the processor to:
monitor low resolution sensor device data of at least one of the plurality of sensor devices for an object within a vehicle travel path that;
upon detection of the object within the vehicle travel path, compare a closing distance rate relative to the object with a closing threshold; and
when the closing distance rate exceeds the closing threshold, produce a collision avoidance signal; and
a vehicle collision mitigation module including instructions that, when executed by the processor, cause the processor to:
produce, in response to the collision avoidance signal, a handover command operable to initiate a vehicle control handover to an autonomous operational mode for transmission via the communication interface;
when the closing distance rate does not exceed the closing threshold, determine a plurality of optional secondary vehicle travel paths of the vehicle originating from a current location of the vehicle; and
determine, from the plurality of optional secondary vehicle travel paths, a secondary vehicle travel path to produce a determined secondary vehicle travel path, wherein the determined secondary travel path functions to mitigate the closing distance rate, the determined secondary vehicle travel path including an adjacent traffic lane defining an unavailable gap for receiving the vehicle; and
generate a vehicle action command operable to autonomously engage the determined secondary vehicle travel path for transmission via the communication interface.

10. The vehicle control unit of claim 9, wherein the determined secondary vehicle travel path further comprises at least one of:
an adjacent traffic lane defining an available gap for receiving a vehicle;
an adjacent region defining the available gap for receiving the vehicle; and
the adjacent region defining the unavailable gap for receiving the vehicle.

11. The vehicle control unit of claim 9, wherein the vehicle collision mitigation module further including instructions that, when executed by the processor, cause the processor to autonomously engage the determined secondary travel path by:
autonomously adjusting a vehicle acceleration based on the determined secondary travel path; and
autonomously adjusting a vehicle heading based on the determined secondary travel path.

12. The vehicle control unit of claim 9, wherein the determined secondary vehicle travel path includes a lateral gap adjacent to the object as an objective.

* * * * *